US010503825B2

(12) United States Patent
Otaki

(10) Patent No.: US 10,503,825 B2
(45) Date of Patent: Dec. 10, 2019

(54) INFORMATION PROCESSING DEVICE, INFORMATION PROCESSING METHOD, AND NON-TRANSITORY COMPUTER-READABLE MEDIUM

(71) Applicant: FUJI XEROX CO., LTD., Tokyo (JP)

(72) Inventor: Masanobu Otaki, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/661,035

(22) Filed: Mar. 18, 2015

(65) Prior Publication Data

US 2015/0301997 A1 Oct. 22, 2015

(30) Foreign Application Priority Data

Apr. 16, 2014 (JP) ................... 2014-084569

(51) Int. Cl.
*G06F 17/20* (2006.01)
*G06F 17/24* (2006.01)
*G06F 16/93* (2019.01)
*G06F 17/22* (2006.01)

(52) U.S. Cl.
CPC ............ *G06F 17/248* (2013.01); *G06F 16/93* (2019.01); *G06F 17/2235* (2013.01)

(58) Field of Classification Search
CPC .................................................. G06F 17/248
See application file for complete search history.

(56) References Cited

U.S. PATENT DOCUMENTS

| | | | | |
|---|---|---|---|---|
| 2004/0189699 A1* | 9/2004 | Dobronsky | ........... | G06F 3/1423 715/751 |
| 2005/0044192 A1* | 2/2005 | Applin | .................... | H04L 29/06 709/223 |
| 2005/0228899 A1* | 10/2005 | Wendkos | ................ | H04L 51/12 709/232 |
| 2006/0178934 A1* | 8/2006 | Besmertnik | .......... | G06Q 30/02 705/14.6 |
| 2008/0177588 A1* | 7/2008 | Abbott | ................... | G06Q 30/02 709/224 |
| 2008/0215686 A1* | 9/2008 | Meredith | ............. | G06Q 10/107 709/206 |

(Continued)

FOREIGN PATENT DOCUMENTS

| | | |
|---|---|---|
| JP | 10-334086 A | 12/1998 |
| JP | 2002-24117 A | 1/2002 |

OTHER PUBLICATIONS

Communication dated Apr. 3, 2018 from the Japanese Patent Office in counterpart Japanese application No. 2014-084569.

(Continued)

*Primary Examiner* — Keith D Bloomquist
(74) *Attorney, Agent, or Firm* — Sughrue Mion, PLLC

(57) ABSTRACT

An information processing device includes a creation unit, a replacement unit, and a generation unit. The creation unit creates a document using a template. The replacement unit replaces a first address embedded into a document created by the creation unit with a second address that is an address at which an access log is acquirable. The generation unit generates information associating template identification information that identifies a template used in a document created by the creation unit, the first address, and the second address.

14 Claims, 9 Drawing Sheets

(56) References Cited

U.S. PATENT DOCUMENTS

| | | | | |
|---|---|---|---|---|
| 2010/0114691 A1* | 5/2010 | Wu | ............... | G06Q 10/0637 |
| | | | | 705/14.44 |
| 2014/0280380 A1* | 9/2014 | Jagtap | ............... | G06F 17/30896 |
| | | | | 707/809 |
| 2015/0006672 A1* | 1/2015 | Morel | ............... | G06F 17/30879 |
| | | | | 709/217 |

OTHER PUBLICATIONS

Communication dated Jan. 23, 2018 from the Japanese Patent Office in counterpart Japanese application No. 2014-084569.

\* cited by examiner

| DOCUMENT ID | CREATION TIME | LINK ID | LINK INFORMATION | TEMPLATE ID |
|---|---|---|---|---|
| 1021 | 2013/11/3 15:00:05 | 1 | http://xxx.aaa.ccc/test.html | A001 |
| 1021 | 2013/11/3 15:00:05 | 2 | http://www.xxx.yyy.zzz/home.html | A001 |
| 1022 | 2013/11/20 10:23:34 | 1 | https://xxxxxx.xxxx.xxxx | B001 |
| 1023 | 2013/12/12 13:55:12 | 1 | http://aaaa.aaaa.aaaa | Z123 |

FIG. 9

TEMPLATE LIST — 900

DISPLAY FILTER

910 — CATEGORY 1: [▾]  CATEGORY 2: [▾]  CATEGORY 3: [▾]

KEYWORD: [          ]  [DISPLAY]

920 — [CREATE NEW]

930 ↗

| SAMPLE | TEMPLATE NAME/NO. | CATEGORY | DATE REGISTERED | NO. OF DOCUMENTS CREATED | USAGE | DESCRIPTION |
|---|---|---|---|---|---|---|
|  | STORE OPENING FLYER A3 VERTICAL OPEN-A3-001 | FLYER – FOR CUSTOMERS | 2013/12/1 | 5 | 204 TIMES | A FLYER FOR OPENING A RESTAURANT. |
|  | STORE OPENING FLYER A4 HORIZONTAL OPEN-A4-003 | FLYER – FOR CUSTOMERS | 2013/12/2 | 1 | 52 TIMES | A FLYER FOR OPENING A CLINIC. |

932  934  936  938  940  942  944

NO. DISPLAYED: [▾]  X-X (OUT OF X)  [⇦][⇩] 1 [⇧][⇨]

• • •

NO. DISPLAYED: [▾]  X-X (OUT OF X)  [⇦][⇩] 1 [⇧][⇨]

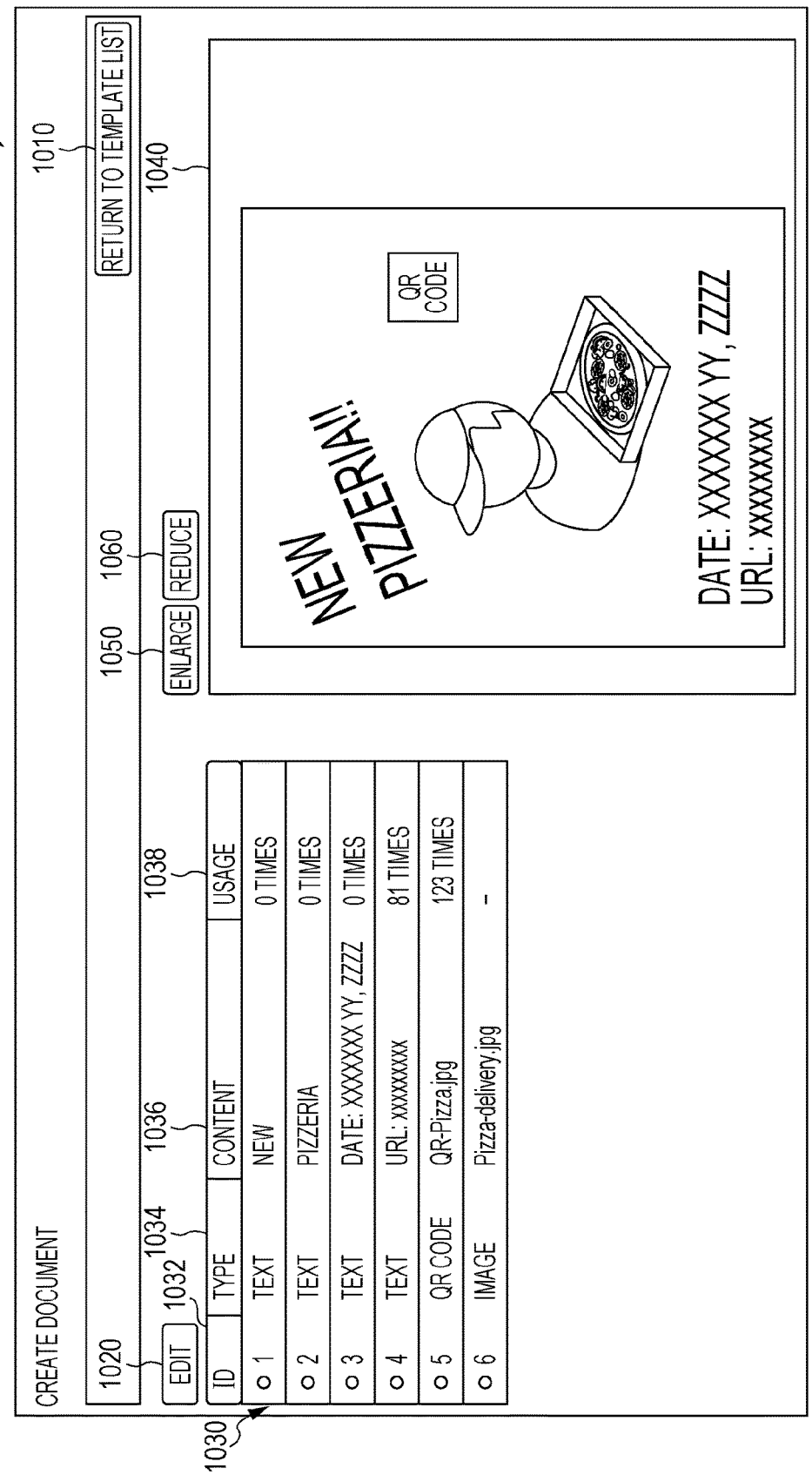

INFORMATION PROCESSING DEVICE, INFORMATION PROCESSING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2014-084569 filed Apr. 16, 2014.

BACKGROUND

The present invention relates to an information processing device, an information processing method, and a non-transitory computer-readable medium.

SUMMARY

According to an aspect of the invention, there is provided an information processing device that includes a creation unit, a replacement unit, and a generation unit. The creation unit creates a document using a template. The replacement unit replaces a first address embedded into a document created by the creation unit with a second address that is an address at which an access log is acquirable. The generation unit generates information associating template identification information that identifies a template used in a document created by the creation unit, the first address, and the second address.

BRIEF DESCRIPTION OF THE DRAWINGS

An exemplary embodiment of the present invention will be described in detail based on the following figures, wherein:

FIG. 9 is an explanatory diagram illustrating an exemplary process according to an exemplary embodiment;

FIG. 10 is an explanatory diagram illustrating an exemplary process according to an exemplary embodiment.

DETAILED DESCRIPTION

Hereinafter, an exemplary embodiment related to realizing the present invention will be described by way of example on the basis of the drawings.

Figure 1:
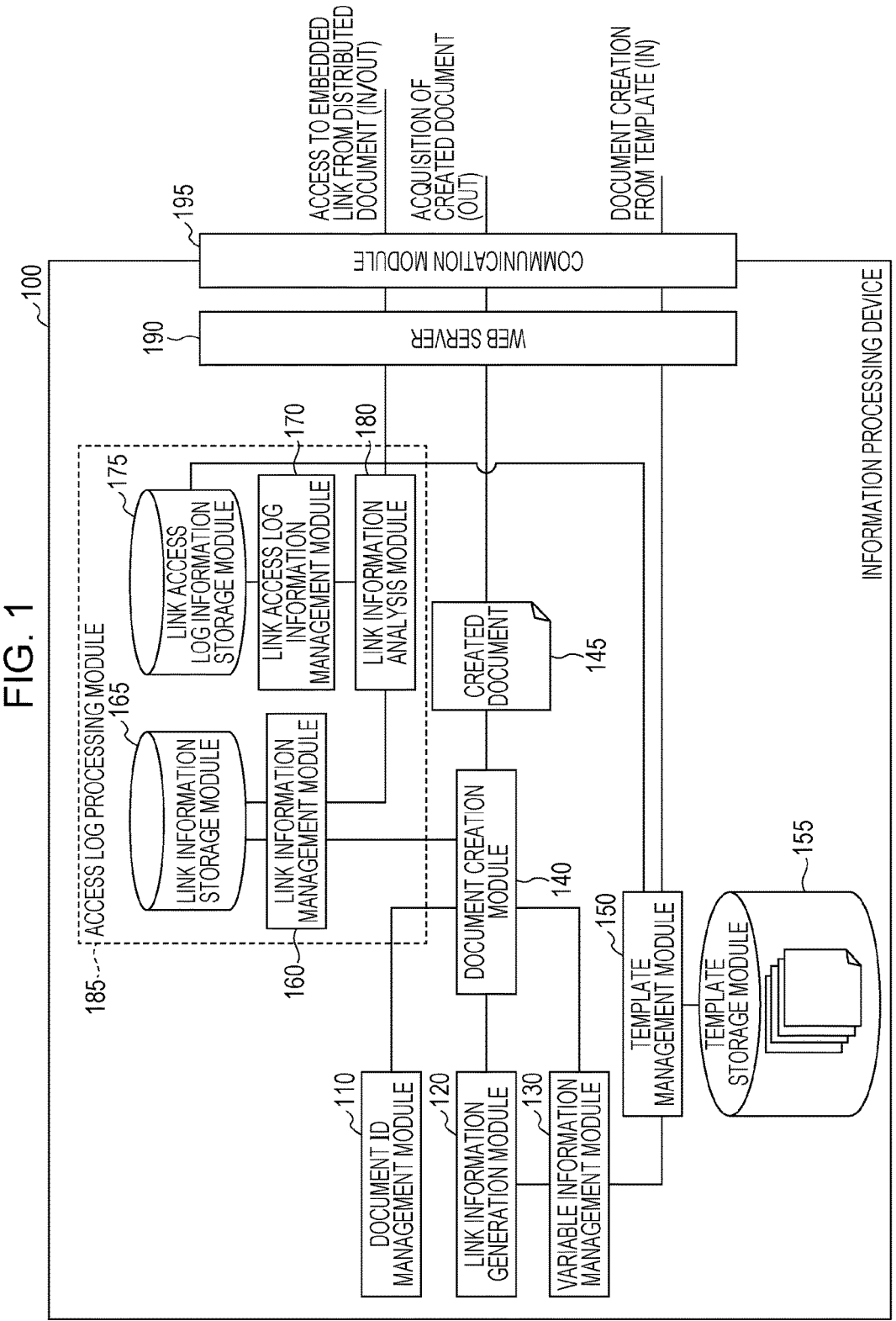
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or devices are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random access memory (RAM), an auxiliary or external storage medium, a storage device accessed via a communication link, and a register or the like inside a central processing unit (CPU).

An information processing device 100 according to the exemplary embodiment creates a document using a template, and records accesses to the document as an access log of accesses to the template. As illustrated by the example of FIG. 1, the information processing device 100 includes a document ID management module 110, a link information generation module 120, a variable information management module 130, a document creation module 140, a template management module 150, a template storage module 155, an access log processing module 185, a web server 190, and a communication module 195.

Note that a template refers to a model of a document. Areas that are editable (hereinafter also called variable information) and areas that are not editable are specified, and the document creator creates a document by editing only the areas that are editable. By creating a document from a model, it is possible to create a customized document while still following brand rules and document creation rules (for example, a certain field may allow only vertical writing, and disallow horizontal writing).

The information processing device 100 is provided in a service generally called template publishing. With template publishing, it is desirable for the usage of documents created from templates (such as Portable Document Format (PDF) files, for example) to be reflected in a server that manages templates or in the original templates, and use such information when revising or retiring templates, and also when creating documents. However, usage information after a document such as a PDF is created from a template is not typically managed and collected directly by the server.

The document ID management module 110 is connected to the document creation module 140. In the exemplary embodiment, the document ID management module 110 generates and manages document identification information that uniquely identifies a created document 145 that is created by the document creation module 140. Additionally, the document ID management module 110 may also manage the created document 145 together with the document identification information. In other words, the document ID management module 110 provides indexed management of the IDs of created documents.

The link information generation module 120 is connected to the variable information management module 130 and the document creation module 140, and generates link information to embed into a document. The link information generation module 120 generates a second address, which is an address at which an access log is acquirable. Herein, an address refers to information indicating a location where information is stored. Specifically, an address may be a uniform resource identifier (URI; note that this includes a uniform resource locator (URL)). The second address replaces a first address embedded into the created document 145 created by the document creation module 140, on the basis of a user operation. The first address is an address generated by a user operation, and is an address that the user originally wants to be accessed. The second address may be an address at which the information processing device 100 may acquire an access log. In the first example, the second address is an address indicating the information processing device 100 (web server 190), but the access log processing module 185 may also be incorporated into an information processing device other than the information processing device 100. In this case, the second address is the address of the information processing device incorporating the access log processing module 185. In other words, it is sufficient for the second address to indicate the access log processing module 185 that is able to acquire an access log.

Note that the second address is an address embedded into the created document 145, and when the embedded address is accessed by a recipient of the created document 145, the information processing device 100 (web server 190) is accessed, and a link information analysis module 180 acquires an access log. When the second address is accessed, an HTTP redirect function is used as discussed later to transmit the first address to the accessing source, and the first address is automatically accessed by the browser of the accessing source. In other words, to access the first address, the second address is traversed first. By traversing the second address, an access to an address inside the document, or in other words to the template that was used to create that document, is counted as an access log.

The variable information management module 130 is connected to the link information generation module 120, the document creation module 140, and the template management module 150. The variable information management module 130 manages variable information in a template received from the template management module 150. Herein, variable information refers to a site that may be changed by a user operation. For example, variable information may be a product name field or description field in a template, or a site where an address is embedded. In other words, the variable information management module 130 manages variable information of a template and embedded link information input by a user.

The document creation module 140 is connected to the document ID management module 110, the link information generation module 120, the variable information management module 130, a link information management module 160 of the access log processing module 185, and the web server 190. The document creation module 140 creates the created document 145 using a template in the template storage module 155, and hands over the created document 145 to the web server 190. Additionally, on the basis of a user operation, the document creation module 140 replaces a first address embedded into the created document 145 created by the document creation module 140 with a second address, which is an address at which an access log is acquirable. Subsequently, the document creation module 140 generates information associating the first address, the second address, and template identification information that identifies the template used in the created document 145 created by the document creation module 140, and hands over the generated information to the link information management module 160. Note that the user operation is conducted from an external information processing device (a document creator's terminal 230 illustrated by the example of FIG. 2 discussed later) via the web server 190 and the communication module 195. In other words, the document creation module 140 actually creates a document from a template, variable information, embedded link information, and document identification information. The document identification information is acquired from the document ID management module 110. The embedded link information is acquired from the link information generation module 120. The created document 145 is a document created from a template according to a user operation.

The template management module 150 is connected to the variable information management module 130, the template storage module 155, a link access log information storage module 175 of the access log processing module 185, and the web server 190. The template management module 150 manages templates in the template storage module 155, and hands over a template selected by a user operation to the variable information management module 130. Specifically, the template management module 150 manages actions such as adding, removing, editing, and listing templates in the template storage module 155, and also extracts a template to use when a document is created.

Additionally, the template management module 150 displays a result of a log recorded in the link access log information storage module 175. Also, the template management module 150 acquires, from a link access log information management module 170, information indicating how much link information embedded in a document created from a relevant template has been used, and displays the acquired information when listing or editing templates. For example, when displaying a list for selecting a template, an access log extracted from the link access log information storage module 175 is displayed as information for each template (such as information indicating how much a document created using that template has been accessed). Also, when creating a document using a template, the usage of address information embedded as variable information is acquired and displayed. An example will be discussed later using the examples of FIGS. 9 and 10.

The template storage module 155 is connected to the template management module 150. The template storage module 155 stores templates created in advance. The created document 145 is created using such a template.

The access log processing module 185 includes a link information management module 160, a link information storage module 165, a link access log information management module 170, a link access log information storage module 175, and a link information analysis module 180. The access log processing module 185 manages access logs, and is accessed as a result of an access to the second address embedded in the created document 145.

The link information management module 160 is connected to the document creation module 140, the link information storage module 165, and the link information analysis module 180. The link information management module 160 causes the link information storage module 165 to store template identification information that identifies a template used for document creation generated by the document creation module 140, in association with the first address and the second address.

The link information storage module 165 is connected to the link information management module 160. The link information storage module 165 stores information associating the template identification that identifies a template used for document creation, the first address, and the second address. An example will be discussed later using the link information table 600 illustrated by the example of FIG. 6.

The link access log information management module 170 is connected to the link access log information storage module 175 and the link information analysis module 180. When an access to the second address is sensed, the link access log information management module 170 records the access in the link access log information storage module 175 as an access log of access to the template indicated by the template identification information corresponding to the second address. In this case, information in the link information storage module 165 obtained via the link information management module 160 is used to extract the template identification information from the second address.

The link access log information storage module 175 is connected to the template management module 150 and the link access log information management module 170. The link access log information storage module 175 stores an access log of access to an address embedded in the created document 145. An example will be discussed later using the link access log information table 800 illustrated by the example of FIG. 8.

The link information analysis module 180 is connected to the link information management module 160, the link access log information management module 170, and the web server 190. When an access to the second address is sensed, the link information analysis module 180 transmits the first address corresponding to the second address to the accessing source that accessed the second address. In other words, an HTTP redirect function is included. In this case, information in the link information storage module 165 obtained via the link information management module 160 is used to convert from the second address to the first address. Additionally, the link information analysis module 180 may also use an argument of the URL at which the information processing device 100 is accessed (such as document identification information) to query the link information management module 160 and acquire the URL to be actually accessed.

The web server 190 is connected to the document creation module 140, the template management module 150, the link information analysis module 180, and the communication module 195. The web server 190 is a typical web server. Specifically, the web server 190 causes the information processing device 100 to function as a web server that provides a document creation service, and in addition, provides an HTTP redirect function with respect to accesses to an address embedded in a document created by the document creation service.

The communication module 195 is connected to the web server 190. The communication module 195 communicates with external devices (such as the viewer's mobile terminal 210, the viewer's mobile terminal 220, and the document creator's terminal 230 illustrated by the example of FIG. 2 discussed later). For example, the communication module 195 accepts an instruction for document creation using a template from the document creator's terminal 230, transmits a created document 145 to the document creator's terminal 230, receives an access to an address embedded in the created document 145 from the viewer's mobile terminal 210 or the like, and also replies back to the viewer's mobile terminal 210 with an address obtained by the HTTP redirect function.

Additionally, the document creation module 140 may also generate the second address on the basis of document identification information that identifies the created document 145 created by the document creation module 140. Herein, "on the basis of" may mean that the second address is in a format that includes the document identification information itself, or that the second address is in a format that includes information converted from the document identification information, for example. In the case of using information converted from the document identification information, it is sufficient for the information to allow restoration of the document identification information from the converted information. Also, the document creation module 140 may hand over the document identification information instead of the second address to the link information management module 160. In other words, information associating template identification information, the first address, and the document identification information may be generated instead of information associating the template identification information, the first address, and the second address.

In this case, the link information management module 160 stores the document identification information instead of the second address as the information handed over from the document creation module 140. In other words, information associating template identification information, the first address, and the document identification information may be stored instead of information associating the template identification information, the first address, and the second address.

Subsequently, when an access to the second address is sensed, the link access log information management module 170 may extract the document identification information from the second address, and record the extracted result as an access log of access to the template with the template identification information corresponding to the relevant document identification information.

In addition, when an access to the second address is sensed, the link information analysis module 180 may extract document identification information from the second address, and transmit the first address corresponding to the document identification information to the accessing source that accessed the second address.

Additionally, the document creation module 140 may also generate the second address on the basis of document identification information and address identification information that identifies the second address embedded in a document. Herein, "on the basis of" may mean that the second address is in a format that includes the combination of the document identification information and the address identification information, or that the second address is in a format that includes information converted from the combination of the document identification information and the address identification information, for example. In the case of using information converted from the combination of the document identification information and the address identification information, it is sufficient for the information to allow restoration of the combination of the document identification information and the address identification information from the converted information. Additionally, the document creation module 140 may also use the combination of the document identification information and the address identification information instead of the second address. In other words, information associating template identification information, the first address, the document identification information, and the address identification information may be generated instead of information associating the template identification information, the first address, and the second address.

In this case, the link information management module 160 stores the combination of the document identification information and the address identification information instead of the second address as the information handed over from the document creation module 140. In other words, information associating template identification information, the first address, the document identification information, and the address identification information may be stored instead of information associating the template identification information, the first address, and the second address.

Subsequently, when an access to the second address is sensed, the link information analysis module 180 may extract document identification information and the address identification information from the second address, and transmit the first address corresponding to the document identification information and the address identification information to the accessing source that accessed the second address.

Note that when an access to the second address is sensed, the link access log information management module 170 may extract the document identification information and the address identification information from the second address, and record the extracted result as an access log of access to the template with the template identification information corresponding to the document identification information and the address identification information. Also, access to an address of the address identification information in the template may also be recorded as an access log. In this case, not only an access log of the template but also an access log of access to the address information in the template are recorded.

Note that the case of desiring to change the address embedded into a document after distribution (the address originally intended by the user) may also be accommodated. In other words, since the original address is not directly embedded into the document, by rewriting the information in the link information storage module 165, it is possible to modify the address to be accessed, without rewriting the distributed document.

Figure 2:
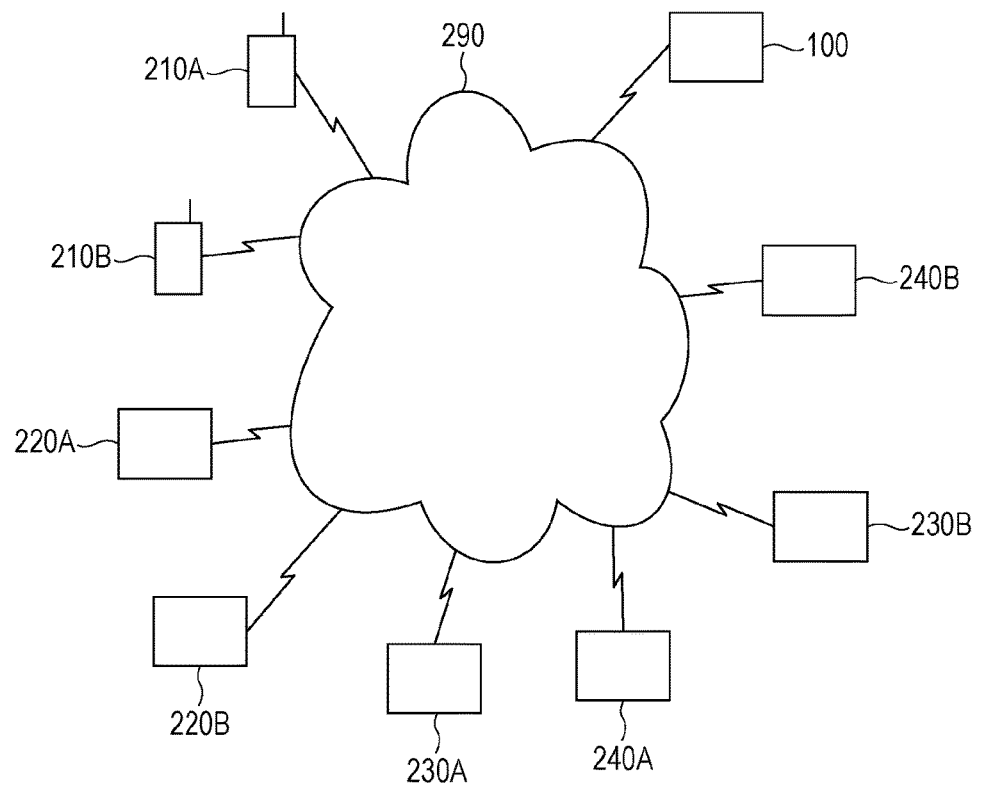
FIG. 2 is an explanatory diagram illustrating an exemplary system configuration that realizes an exemplary embodiment.

FIG. 2 is an explanatory diagram illustrating an exemplary system configuration that realizes an exemplary embodiment.

An information processing device 100, a viewer's mobile terminal 210A, a viewer's mobile terminal 210B, a viewer's mobile terminal 220A, a viewer's mobile terminal 220B, a document creator's terminal 230A, a document creator's terminal 230B, a link destination web server 240A, and a link destination web server 240B are interconnected via a communication network 290. For example, an instruction for document creation using a template is transmitted from the document creator's terminal 230A to the information processing device 100. The information processing device 100 creates a document with embedded address information in accordance with the instruction, and transmits the document to the document creator's terminal 230A. The document creator's terminal 230A distributes the document to devices such as the viewer's mobile terminal 210A and the viewer's mobile terminal 220A. At the viewer's mobile terminal 210A and the like, the address embedded in the document is accessed according to an operation by a viewer who views the document, and the link destination web server 240A or the like is accessed via the information processing device 100. When an access is conducted via the information processing device 100, the information processing device 100 records the access as an access log of access to the template used to create the document. The communication network 290 may be wireless, wired, or a combination of the two, and may use the Internet or the like as a communication infrastructure, for example.

Figure 3:
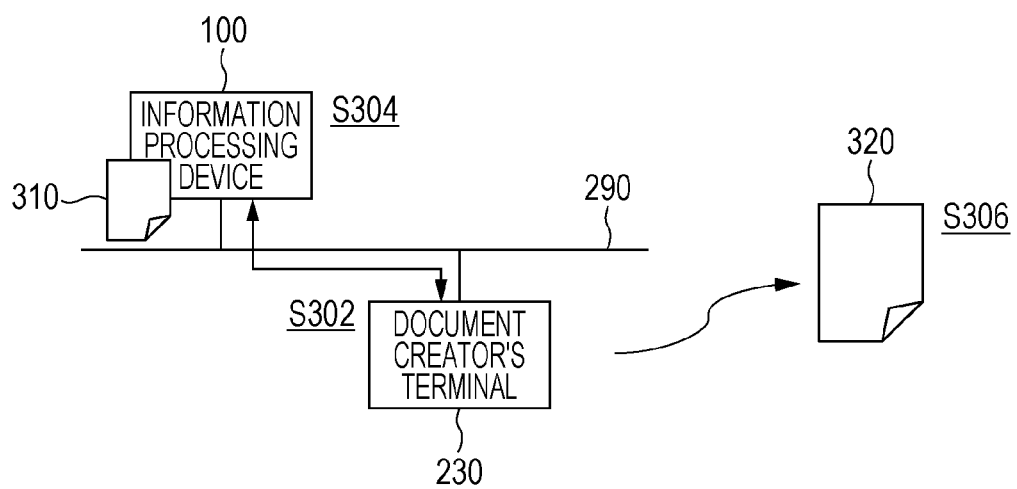
FIG. 3 is an explanatory diagram illustrating an exemplary process according to an exemplary embodiment.
Figure 4:
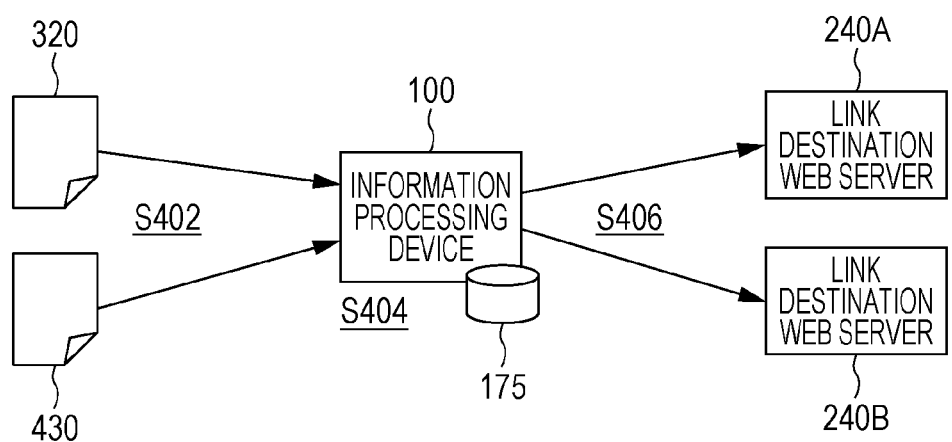
FIG. 4 is an explanatory diagram illustrating an exemplary process according to an exemplary embodiment.

FIGS. 3 and 4 will be used to describe an overview of a process by the information processing device 100. Note that this description is intended to aid comprehension of the exemplary embodiment.

FIG. 3 is an explanatory diagram illustrating an exemplary process according to the exemplary embodiment. When creating a document (such as a PDF) from a template 310, the URL of the information processing device 100 is embedded rather than the URL information configured by the user as variable information (URL-A), and correspondence information associating the user-configured URL and the created document is managed on the information processing device 100. Specifically, the process is as follows.

In step S302, the information processing device 100, in accordance with user operations from the document creator's terminal 230, embeds a link to the URL-A in the template 310, and starts the creation of a distributed document (electronic) 320.

In step S304, the information processing device 100 manages the distributed document (electronic) 320 created by the information processing device 100, and the embedded URL. In other words, the information processing device 100 associates the distributed document (electronic) 320 and the URL-A.

In step S306, a distributed document (electronic) 320 embedded with the URL-S (an address for accessing the information processing device 100) is created and distributed.

FIG. 4 is an explanatory diagram illustrating an exemplary process according to the exemplary embodiment. When URL information embedded in the distributed document (electronic) 320 or a distributed document (paper) 430 is accessed, the information processing device 100 is accessed together with identification information of the distributed document (electronic) 320 or the distributed document (paper) 430. In the information processing device 100, correspondence information between the URL to be accessed (that is, the user-configured URL) and the identification information of the distributed document (electronic) 320 or the distributed document (paper) 430 is used to record and manage an access log of access to the template, and the URL to be accessed (the user-configured URL) is made to be accessed.

In step S402, the information processing device 100 is first accessed according to the embedded URL information of the distributed document (electronic) 320 or the distributed document (paper) 430.

In step S404, the correspondence with an URL is checked on the information processing device 100, and a log is recorded.

In step S406, the URL to actually access is accessed.

Figure 5:
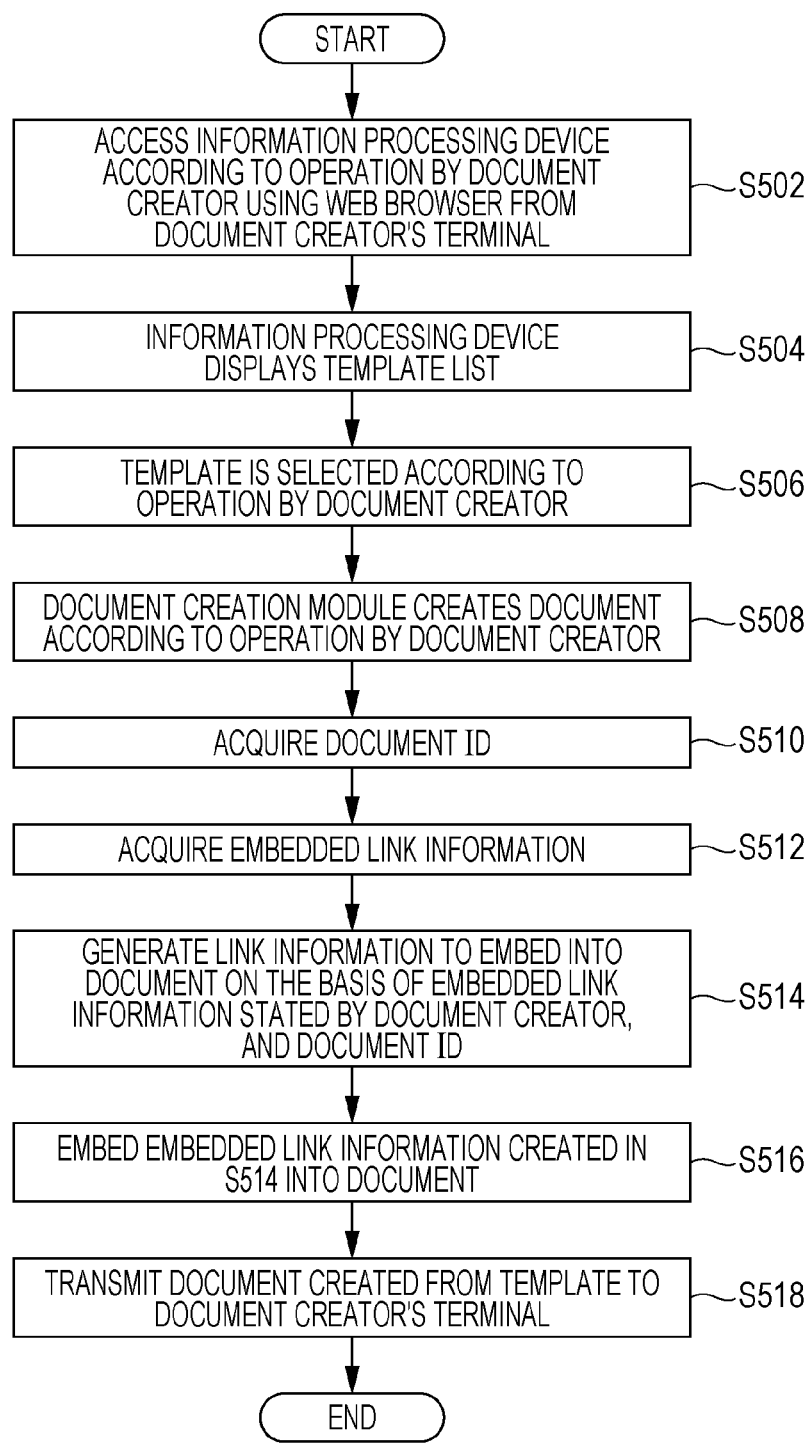
FIG. 5 is a flowchart illustrating an exemplary process according to an exemplary embodiment.

FIG. 5 is a flowchart illustrating an exemplary process according to the exemplary embodiment (document creation process example).

In step S502, the information processing device 100 is accessed from the document creator's terminal 230 using a web browser, in accordance with an operation by a document creator. In the following process flow, an operation of the document creator is an operation from the document creator's terminal 230 using a web browser.

In step S504, the information processing device 100 displays a template list.

In step S506, a template is selected in accordance with an operation by the document creator.

In step S508, document creation is started, and the document creation module 140 creates a document in accordance with an operation by the document creator.

In step S510, the document creation module 140 acquires a document ID of the document to create from the document ID management module 110.

In step S512, the document creation module 140 acquires embedded link information from the link information generation module 120. For example, the link specified by the document creator may be "http://www.ffffxxxxx.co.jp".

In step S514, the link information generation module 120 generates link information to embed into the document, on the basis of the embedded link information stated by the document creator, and the document ID. For example, the link to actually embed may be "http://<URL of information processing device 100>/home.html?DocID=1021&LinkID=1". Note that in this example, the "DocID=1021" portion is the part that specifies the document ID (document identification information), while the "LinkID=1" portion is the part that specifies the link ID (address identification information). Note that the specification of the link ID may also be omitted if an access log per link is unwanted.

In step S516, the document creation module 140 embeds the embedded link information generated in step S514 into the document.

In step S518, the document created from the template is transmitted to the document creator's terminal 230.

Figure 6:
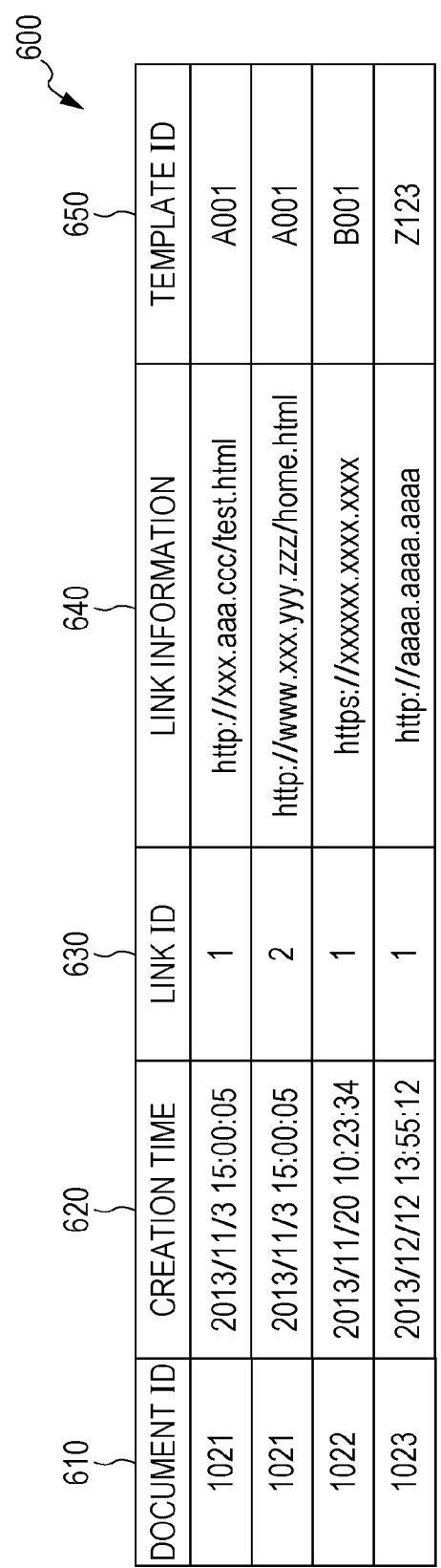
FIG. 6 is an explanatory diagram illustrating an exemplary data structure of a link information table.

According to this process, a link information table 600 is stored in the link information storage module 165. FIG. 6 is an explanatory diagram illustrating an exemplary data structure of the link information table 600. The link information table 600 includes a document ID field 610, a creation time field 620, a link ID field 630, a link information field 640, and a template ID field 650.

The document ID field 610 stores information (a document identification (ID)) for uniquely identifying a document in the present exemplary embodiment. The creation time field 620 stores the time at which the document was created (the time may be the year, month, day, hour, minute, second, fraction of a second, or some combination thereof). The link ID field 630 stores information (a link ID) for identifying a link embedded in a document uniquely within the present exemplary embodiment or the document. The link information field 640 stores link information (specifically, a URL). The template ID field 650 stores information (a template ID) for uniquely identifying a template in the present exemplary embodiment.

Note that the link information table 600 may also be structured to include the template ID field 650, the link information field 640 (first address), and a field that stores the second address (an address for accessing the information processing device 100 (access log processing module 185), being an address that additionally includes at least information corresponding to the template ID). In addition, the link information table 600 may also be structured to include the template ID field 650, the link information field 640, and the document ID field 610. In addition, the link information table 600 may also be structured to include the template ID field 650, the link information field 640, the document ID field 610, and the link ID field 630.

Figures 7, 8:
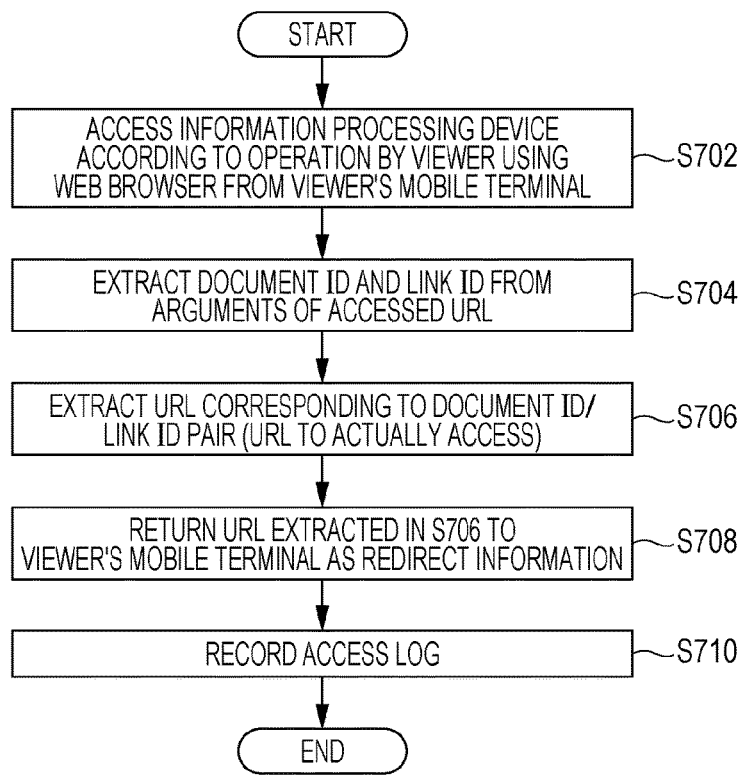
FIG. 7 is a flowchart illustrating an exemplary process according to an exemplary embodiment.
FIG. 8 is an explanatory diagram illustrating an exemplary data structure of a link access log information table.

FIG. 7 is a flowchart illustrating an exemplary process according to the exemplary embodiment (an example of an access process from a link in a distributed document).

In step S702, the information processing device 100 is accessed from the viewer's mobile terminal 210 using a web browser, in accordance with an operation by a viewer. In other words, link information embedded in a document (for example, "http://<URL of information processing device 100>/home.html?DocID=1021&LinkID=1") is used to access the information processing device 100.

In step S704, the link information analysis module 180 extracts a document ID and a link ID from the arguments of the accessed URL. In the above, example, the document ID (DocID=1021) and the link ID (LinkID=1) are extracted from the arguments of the accessed URL.

In step S706, the link information management module 160 extracts an URL (the URL to actually access) corresponding to the pair of the document ID and the link ID. In the case of the above example, since the document ID is 1021 and the link ID is 1, the first row of the link information table 600 is extracted, and "http://xxx.aaa.ccc/test.html" stored in the link information field 640 on the first row is extracted.

In step S708, the link information analysis module 180 replies to the viewer's mobile terminal 210 with the URL extracted in step S706 as redirect information.

In step S710, the link access log information management module 170 records a log of the access.

According to this process, a link access log information table 800 is stored in the link access log information storage module 175. FIG. 8 is an explanatory diagram illustrating an exemplary data structure of a link access log information table 800. The link access log information table 800 includes a log ID field 810, an access time field 820, a document ID field 830, a link ID field 840, and a client identification information field 850.

The log ID field 810 stores information (a log ID) for uniquely identifying an access log in the present exemplary embodiment. The access time field 820 stores the time of the access. The document ID field 830 stores the document ID of the document used for the access. In the above example, "1021" is stored as the document ID. The link ID field 840 stores a link ID. In the above example, "1" is stored as the link ID. The client identification information field 850 stores client identification information. Identification information of the accessing viewer's mobile terminal 210 or the like is stored. From the document ID stored in the document ID field 830 of the link access log information table 800, it is possible to extract the template ID corresponding to the relevant document ID by using the link information table 600, and record the extracted result as an access log of access to the template.

In addition, the link access log information table 800 may use the document ID to reference the link information table 600, and store just the template ID corresponding to the relevant document ID as an access log. Additionally, the link ID field 840 may also be provided. Additionally, the document ID field 830 may also be provided. Besides the above, fields such as the access time field 820 and the client identification information field 850 may also be provided.

In order to refer to the usage (log) of embedded links and select a template, or revise or retire a template, when displaying the template list, the template management module 150 indicates how much a link embedded in a document created from each template has been clicked.

FIG. 9 is an explanatory diagram illustrating an exemplary process according to the exemplary embodiment.

On a template list screen 900 for selecting a template, a display filter specification field 910, a Create New button 920, and a template list display area 930 are displayed.

In the display filter specification field 910, categories (three in the example of FIG. 9) and a keyword may be specified as a template search condition.

The Create New button 920 is a button for giving an instruction to create a new document.

The template list display area 930 includes a sample field 932, a template name/no. field 934, a category field 936, a date registered field 938, a no. of documents created field 940, a usage field 942, and a description field 944. In the sample field 932, a sample (a thumbnail image (reduced image) of a template) is displayed. In the template name/no. field 934, the template name and number of the template are displayed. In the category field 936, the category of the template is displayed. In the date registered field 938, the registration date of the template is displayed. In the no. of documents created field 940, the number of times that a document has been created using the template is displayed. In the usage field 942, the usage of the template (the number of accesses to the template, or in other words, the number of accesses to an address embedded in a document created using the template) is displayed. In the description field 944, a description of the template is displayed.

Additionally, to embed links into frequently used variable information during document creation, when creating a document from a template, the template management module 150 indicates how much a link embedded in each piece of variable information in the relevant template has been clicked.

FIG. 10 is an explanatory diagram illustrating an exemplary process according to the exemplary embodiment.

On the document creation screen 1000 for creating a document, a Return to Template List button 1010, an Edit button 1020, an embedded link information list display area 1030, a document display area 1040, an Enlarge button 1050, and a Reduce button 1060 are displayed.

The Return to Template List button 1010 is a button for giving an instruction to return to the template list (template list screen 900).

The Edit button 1020 is a button for giving an instruction to create a document by editing a selected template.

The embedded link information list display area 1030 includes an ID field 1032, a type field 1034, a content field 1036, and a usage field 1038. In the ID field 1032, an ID of a field that is modifiable by the user (variable information) is displayed. In the type field 1034, the type of that variable information is displayed. In the content field 1036, the current content of the variable information is displayed. In the usage field 1038 the usage of the variable information (in the case of variable information into which an address is embedded, the number of accesses to that address (link in the document)) is displayed.

Figure 11:
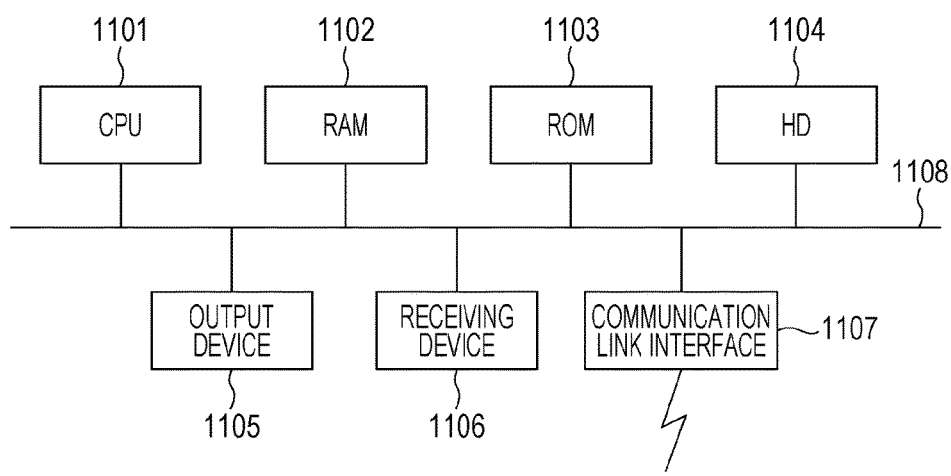
FIG. 11 is a block diagram illustrating an exemplary hardware configuration of a computer that realizes an exemplary embodiment.

Note that a hardware configuration of a computer executing a program that acts as the present exemplary embodiment is a general computer as illustrated by the example of FIG. 11, and specifically is a computer or the like that may be a personal computer or a server. In other words, as a specific example, a CPU 1101 is used as a processing unit (computational unit), while RAM 1102, ROM 1103, and an HD 1104 are used as storage devices. For the HD 1104, a hard disk may be used, for example. The computer is made up of the CPU 1101 that executes programs such as the document ID management module 110, the link information generation module 120, the variable information management module 130, the document creation module 140, the template management module 150, the link information management module 160, the link access log information management module 170, the link information analysis module 180, the access log processing module 185, the web server 190, and the communication module 195, the RAM 1102 that stores such programs and data, the ROM 1103 that stores programs and the like for activating the computer, the HD 1104 which is an auxiliary storage device (and may also be flash memory or the like), a receiving device 1106 that receives data on the basis of user operations with respect to a keyboard, mouse, touch panel, or the like, an image output device 1105 such as a CRT or liquid crystal display, a communication link interface 1107 such as a network interface card for connecting to a communication network, and a bus 1108 for joining and exchanging data with the above components. Multiple such computers may also be connected to each other by a network.

Of the foregoing exemplary embodiments, for those made up of a computer program, software in the form of a computer program is made to be read into a system with the above hardware configuration, and the foregoing exemplary embodiments are realized by the cooperative action of the software and hardware resources.

Note that the hardware configuration illustrated in FIG. 11 illustrates a single exemplary configuration, and that the exemplary embodiment is not limited to the configuration illustrated in FIG. 11 insofar as the configuration still enables execution of the modules described in the exemplary embodiment. For example, some modules may also be realized with special-purpose hardware (such as an ASIC, for example), and some modules may be configured to reside within an external system and be connected via a communication link. Furthermore, it may also be configured such that multiple instances of the system illustrated in FIG. 11 are connected to each other by a communication link and operate in conjunction with each other. Additionally, besides a personal computer in particular, an exemplary embodiment may also be incorporated into a device such as an information appliance, photocopier, fax machine, scanner, printer, or multi-function device (that is, an image processing device having two or more from among scanning, printing, copying, and faxing functions).

Note that although the foregoing exemplary embodiment generally presents an example of a link to a URI (including a URL) as an address to embed into a document, an information image expressing address information may also be printed. Note that an information image refers to an image code that is systematically created to express electronic data in a machine-readable form, and specifically refers to a one-dimensional barcode, a two-dimensional code, or the like. The two-dimensional code may be a Quick Response code (QR code; registered trademark), for example. In addition, by implementing an information image, it becomes possible to acquire an access log for not only electronic documents, but also for paper documents. In other words, after the created document 145 is received, the created document 145 is printed by the document creator's terminal 230, and the printed paper document is distributed. Subsequently, the information image on the paper document is scanned by a camera-equipped viewer's mobile terminal 210 or the like, the address of the information processing device 100 expressed in the information image is extracted, and the link destination link destination web server 240 that was originally intended by the document creator is accessed via the access to the information processing device 100.

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), an internet, an intranet, an extranet, or some combination thereof, or alternatively, by being modulated onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
    a creation unit configured to create a document according to a template, selected from a plurality of sample templates, wherein the template specifies an area of the document that may be edited;
    a replacement unit configured to replace a first address, embedded into the document created by the creation unit, with a second address at which an access log is acquirable;
    a generation unit configured to generate information associating template identification information that identifies the template, the first address, and the second address;
    a storage unit configured to store the information;
    a log recording unit configured, in response to an access to the second address, to record the access in the access log; and
    a transmitting unit configured, in response to an access to the second address, to transmit the first address to an accessing source in response the access to the second address,
    wherein the accessing source performed the access,
    wherein the creation unit is further configured to create the document in response to a user selection of the template from a user interface displaying the plurality of sample templates and usage history for each of the sample templates at a same time,
    wherein the usage history comprises statistics which indicate numbers of how many times ones of a plurality of links, including the second address, have been accessed from the document,
    wherein the creation unit is further configured to, in response to a user selection to create the document based on one of the plurality of samples templates, display a create document user interface, wherein the create document user interface comprises an image of the one of the plurality of samples templates and, alongside of the image, a plurality of fields in the image, and wherein the create document user interface further comprises, alongside the plurality of fields, other fields indicating a number of times that a link in one of those fields have been accessed in other documents created from the one of the plurality of sample templates.

2. The information processing device according to claim 1, wherein the storage unit is further configured to store document identification information, the log recording unit is further configured, in response to an access to the second address being sensed, to extract the document identification information from the second address, and to record an access log of access to a template with template identification information corresponding to the document identification information, and the transmitting unit is further configured, in response to an access to a second address being sensed, extract the document identification information from the second address, and to transmit a first address corresponding to relevant document identification information to an accessing source that accessed the second address.

3. The information processing device according to claim 2, wherein the storage unit is further configured to store the document identification information and address identification information, and the transmitting unit is further configured, in response to an access to a second address being sensed, to extract the document identification information and the address identification information from the second address, and to transmit a first address corresponding to the document identification information and the address identification information to the accessing source that accessed the second address.

4. An information processing method comprising:

creating a document using a template selected from a plurality of sample templates;

replacing a first address embedded into a created document with a second address that is an address at which an access log is acquirable;

generating information associating template identification information that identifies a template used in a created document, the first address, and the second address, the template specifies whether an area of a document may be edited;

storing the information;

in response to an access to the second address, recording the access in the access log; and in response to an access to the second address, to transmit the first address to an accessing source in response the access to the second address, wherein the accessing source performed the access, wherein creating the document is in response to a user selection of the template from a user interface displaying the plurality of sample templates and usage history for each of the sample templates at a same time, wherein the usage history comprises statistics which indicate numbers of how many times ones of a plurality of links, including the second address, have been accessed from the document, wherein the method further comprises displaying, in response to a user selection to create the document based on one of the plurality of samples templates, a create document user interface, wherein the create document user interface comprises an image of the one of the plurality of sample templates and, alongside of the image, plurality of fields in the image, and wherein the create document user interface further comprises, alongside the plurality of fields, other fields indicating a number of times that a link in one of those fields have been accessed in other documents created from the one of the plurality of sample templates.

5. A non-transitory computer-readable medium storing a program causing a computer to execute a process for processing information, the process comprising:

creating a document using a template selected from a plurality of sample templates;

replacing a first address embedded into a created document with a second address that is an address at which an access log is acquirable;

generating information associating template identification information that identifies a template used in a created document, the first address, and the second address, the template specifies whether an area of a document may be edited;

storing the information;

in response to an access to the second address, recording the access in the access log; and in response to an access to the second address, to transmit the first address to an accessing source in response the access to the second address, wherein the accessing source performed the access, wherein creating the document is in response to a user selection of the template from a user interface displaying the plurality of sample templates and usage history for each of the sample templates at a same time, wherein the usage history comprises statistics which indicate numbers of how many times ones of a plurality of links, including the second address, have been accessed from the document, wherein the process further comprises displaying, in response to a user selection to create the document based on one of the plurality of samples templates, a create document user interface, wherein the create document user interface comprises an image of the one of the plurality of sample templates and, alongside of the image, a plurality of fields in the image, and wherein the create document user interface further comprises, alongside the plurality of fields, other fields indicating a number of times that a link in one of those fields have been accessed in other documents created from the one of the plurality of sample templates.

6. The information processing device according to claim 1, wherein the template further specifies area of the document that are not editable.

7. The information processing device according to claim 1, wherein the document is a portable document format (PDF) document.

8. The information processing device according to claim 1, wherein the usage history comprises an illustration of a number of times that addresses other than the second address have been clicked in ones of the sample templates prior to the creation of the document.

9. The information processing device according to claim 1, wherein the first address is stored in a memory after being replaced by the second address in the document, the replacement unit is further configured to replace the first address in the memory with a third address in the memory, in response to a user operation to change the first address to the third address after the document is distributed from the user to another user, and to not change the second address in response to replacing the first address with the third address, and the generation unit is further configured to update the information to associate the second address with the third address and to remove association of the second address to the first address in response to the user operation such that in response to another access to the second address after the first address is replaced in the memory with the third address, to transmit the third address to the accessing source in response the access to the second address.

10. The information processing device according to claim 1, wherein, in response to the user selection, the user interface further displays a plurality of fields of the template predetermined to be fields of the template which are user-editable during creation of the document, and wherein the fields of the template are displayed alongside usage history of the template, the usage history of the template comprising a display of a number of times that a first link in the document is used and a number of times a second link in the document is used, at least one of the first link and the second link comprising the second address.

11. The information processing device according to claim 1, wherein the statistics of the usage history comprise first statistics and second statistics for each of the sample templates, wherein the first statistics indicate numbers of how many times each of the sample templates have been created, wherein the second statistics indicate the numbers of how many times the ones of the plurality of links, including the second address, have been accessed from the document and from other documents created from other ones of the sample templates, and wherein the user interface displays each of the first statistics and the second statistics at the same time as displaying the plurality of sample templates.

12. The information processing device according to claim 11, wherein at least one of the plurality of links, other than the second address, comprises a Quick Response (QR) code, and the log recording unit is further configured to record a number of accesses to the QR code as part of the numbers of how many times ones of the plurality of links have been accessed.

13. The information processing device according to claim 1, wherein the user interface further displays a search bar in a same window as the usage history, wherein the document is created from one of the plurality of sample templates, wherein the usage history further comprises a number of other documents created from the one of the plurality of sample templates, and wherein the number of other documents is displayed alongside the number of how many times ones of the plurality of links have been accessed from the document.

14. The information processing device according to claim 1, wherein the create document user interface further comprises an edit button configured to, in response to a user selection of the edit button, edit a field of the image, and wherein the create document user interface further comprises an enlarge button and a reduce button configured to, in response to a user selection of one of the enlarge button and the reduce button, one of enlarge and reduce the image in the create document user interface.

* * * * *